(12) United States Patent  
Miller et al.

(10) Patent No.: US 10,540,550 B2  
(45) Date of Patent: Jan. 21, 2020

(54) AUGMENTED REALITY SYSTEMS AND METHODS FOR SERVICE PROVIDERS

(71) Applicant: MASTERCARD INTERNATIONAL INCORPORATED, Purchase, NY (US)

(72) Inventors: Matthew James Miller, Redding, CT (US); Jackson Hamburger, Boxford, MA (US); Bradley Roth, Atlanta, GA (US); Louis Antonelli, New York, NY (US)

(73) Assignee: Mastercard International Incorporated, Purchase, NY (US)

( * ) Notice: Subject to any disclaimer, the term of this patent is extended or adjusted under 35 U.S.C. 154(b) by 15 days.

(21) Appl. No.: 15/925,218

(22) Filed: Mar. 19, 2018

(65) Prior Publication Data

US 2018/0268219 A1    Sep. 20, 2018

Related U.S. Application Data

(60) Provisional application No. 62/473,786, filed on Mar. 20, 2017.

(51) Int. Cl.  
*G06K 9/00* (2006.01)  
*G06T 19/00* (2011.01)  
*G06Q 30/02* (2012.01)

(52) U.S. Cl.  
CPC ..... *G06K 9/00671* (2013.01); *G06K 9/00255* (2013.01); *G06Q 30/0201* (2013.01); *G06T 19/006* (2013.01)

(58) Field of Classification Search  
CPC .................................................. G06K 9/00671  
USPC .......................................................... 345/633  
See application file for complete search history.

(56) References Cited

U.S. PATENT DOCUMENTS

| | | | |
|---|---|---|---|
| 8,964,298 B2 | 2/2015 | Haddick | |
| 9,511,291 B2* | 12/2016 | Lyons | G07F 17/3211 |
| 9,766,463 B2 | 9/2017 | Border | |
| 2012/0116559 A1* | 5/2012 | Davis | G06F 3/002 |
| | | | 700/94 |
| 2012/0213404 A1* | 8/2012 | Steiner | G06K 9/00677 |
| | | | 382/103 |
| 2013/0218721 A1* | 8/2013 | Borhan | G06Q 20/322 |
| | | | 705/26.41 |

(Continued)

*Primary Examiner* — Javid A Amini  
(74) *Attorney, Agent, or Firm* — Armstrong Teasdale LLP

(57) ABSTRACT

An augmented reality (AR) computing device for displaying computer-generated elements in augmented reality supported service activities is provided. The AR computing device is configured to scan a first location, using an AR display device, to capture location data including consumer data corresponding to one or more consumers and facial data associated with the one or more consumers. The AR computing device is also configured to select, using the AR display device, a first consumer of the one or more consumers, store the consumer data corresponding to the first consumer in a database, and receive AR data associated with the location data. The AR computing device is further configured to automatically display, using the AR display device, the AR data, receive an update for the AR data, automatically update the AR data in response to the received update, and display, using the AR display device, the updated AR data.

20 Claims, 6 Drawing Sheets

(56) References Cited

U.S. PATENT DOCUMENTS

| | | | | |
|---|---|---|---|---|
| 2013/0278631 A1* | 10/2013 | Border | ............... | G02B 27/017 |
| | | | | 345/633 |
| 2014/0146082 A1* | 5/2014 | So | ............... | G06K 9/00671 |
| | | | | 345/633 |
| 2014/0282162 A1* | 9/2014 | Fein | ............... | G06F 3/0486 |
| | | | | 715/769 |
| 2015/0161821 A1* | 6/2015 | Mazula | ............... | G06T 19/006 |
| | | | | 345/419 |
| 2016/0049094 A1* | 2/2016 | Gupta | ............... | G09B 19/04 |
| | | | | 434/185 |
| 2016/0078449 A1 | 3/2016 | Banerjee | | |
| 2017/0069141 A1* | 3/2017 | Carter | ............... | G02B 27/01 |
| 2017/0364925 A1 | 12/2017 | Wilkinson | | |
| 2018/0018141 A1* | 1/2018 | Wang | ............... | H04N 21/41 |

\* cited by examiner

US 10,540,550 B2

AUGMENTED REALITY SYSTEMS AND METHODS FOR SERVICE PROVIDERS

CROSS-REFERENCE TO RELATED APPLICATIONS

This application claims benefit of U.S. Provisional Application No. 62/473,786, filed Mar. 20, 2017, which is hereby incorporated by reference in its entirety.

BACKGROUND

The field of the present disclosure relates generally to networks and, more particularly, to systems and methods for using augmented reality functionality to display computer-generated elements to support service activities.

The term "augmented reality" (AR) generally refers to a view of a physical, real-world environment of a viewer where certain elements in the view (or AR view) are augmented by computer-generated sensory input, such as sound, video, or graphics data. The computer-generated (CG) elements may be purely computer-generated or generated using a real-world object that is in the viewer's physical environment or is remotely located from the viewer. The CG elements are superimposed onto the viewer's physical environment to create an augmented reality as distinct from the viewer's physical reality. In some implementations, the viewer will use an AR display device to see the AR view. AR display devices may include glasses, goggles, head-up displays (e.g., on a car windshield), or the like. Additionally, a viewer will often have one or more optical instruments, such as cameras, for recording or capturing images of the viewer and the viewer's environment. These cameras may be used to record the viewer's movements for later viewing or transmission.

Many known systems that use of AR are quite limited in their actual use of AR functionality. For example, some known AR-using systems are limited in their ability to present CG elements that have been tailored specifically to the viewer. Some other known AR-using systems are unable to present CG elements that can be used by the viewer for a defined purpose (e.g., to mimic the CG element or to gain usable information from them). Some other known AR-using systems are unable to present continuously updated data from a remote source. For example, these known systems can only present preset CG elements and cannot update them in response to, for example, a remote object or person that is the source for generating the CG element(s). Other known AR-using systems are limited in the ability of a viewer to interact with the CG element. For example, these systems do not provide the ability for a viewer to interact with a CG element such that the CG element updates its appearance or causes an update to the view in the viewer's AR display device.

In addition to AR systems, there are also computer systems that are virtual reality (VR) based computer systems. VR-based systems are different from AR systems that the user's view is entirely computer-generated. VR-based systems may cause safety concerns in certain activities (such as servicing customers in a restaurant environment) where the total immersion in a virtual reality environment may decrease situational awareness and cause injury.

BRIEF DESCRIPTION

In one aspect, an augmented reality (AR) computing device for displaying computer-generated elements in augmented reality supported service activities is provided. The AR computing device includes at least one processor and a memory, and is configured to scan a first location, using an AR display device in communication with the AR computing device, to capture location data, wherein the location data includes consumer data corresponding to one or more consumers and facial data associated with the one or more consumers. The AR computing device is also configured to select, using an input entered into the AR display device, a first consumer of the one or more consumers scanned at the first location, store the consumer data corresponding to the first consumer in a database, and receive AR data associated with the location data including the consumer data corresponding to the first consumer. The AR computing device is further configured to automatically display, using the AR display device, the AR data, wherein the AR data is overlaid over one or more objects, receive an update for the AR data, automatically update the AR data in response to the received update, and display, using the AR display device, the updated AR data.

In another aspect, a computer-implemented method for displaying computer-generated elements in augmented reality supported service activities is provided. The method is implemented using an augmented reality (AR) computing device coupled to a memory device. The method includes scanning a first location, using an AR display device in communication with the AR computing device, to capture location data, wherein the location data includes consumer data corresponding to one or more consumers and facial data associated with the one or more consumers. The method also includes selecting, using an input entered into the AR display device, a first consumer of the one or more consumers scanned at the first location, storing the consumer data corresponding to the first consumer in a database, and receiving AR data associated with the location data including the consumer data corresponding to the first consumer. The method further includes automatically displaying, using the AR display device, the AR data, wherein the AR data is overlaid over one or more objects, receiving an update for the AR data, automatically updating the AR data in response to the received update, and displaying, using the AR display device, the updated AR data.

In yet another aspect, a non-transitory computer readable medium that includes executable instructions for displaying computer-generated elements in augmented reality supported service activities is provided. When the computer executable instructions are executed by an augmented reality (AR) computing device that includes at least one processor in communication with at least one memory device, the computer executable instructions cause the AR computing device to scan a first location, using an AR display device in communication with the AR computing device, to capture location data, wherein the location data includes consumer data corresponding to one or more consumers and facial data associated with the one or more consumers. The computer executable instructions also cause the AR computing device to select, using an input entered into the AR display device, a first consumer of the one or more consumers scanned at the first location, store the consumer data corresponding to the first consumer in a database, and receive AR data associated with the location data including the consumer data corresponding to the first consumer. The computer executable instructions further cause the AR computing device to automatically display, using the AR display device, the AR data, wherein the AR data is overlaid over one or more objects, receive an update for the AR data, automatically update the AR data in response to the received update, and display, using the AR display device, the updated AR data.

BRIEF DESCRIPTION OF THE DRAWINGS

FIG. 1 is a simplified block diagram of an example augmented reality (AR) system.

FIG. 2 is an exemplary view of a user equipped with an AR display device.

FIG. 3 illustrates an example configuration of an AR display device, shown in FIG. 1.

FIG. 4 illustrates an example configuration of an AR computing device, such as AR computing device shown in FIG. 1.

FIG. 5 is an example flow diagram illustrating a method flow implemented by the AR system shown in FIG. 1 for displaying computer-generated elements to support service activities.

FIG. 6 shows an example database configuration within a computer device, along with other related computer components, that may be used to generate and display computer-generated elements using augmented reality data.

DETAILED DESCRIPTION

Figure 1:
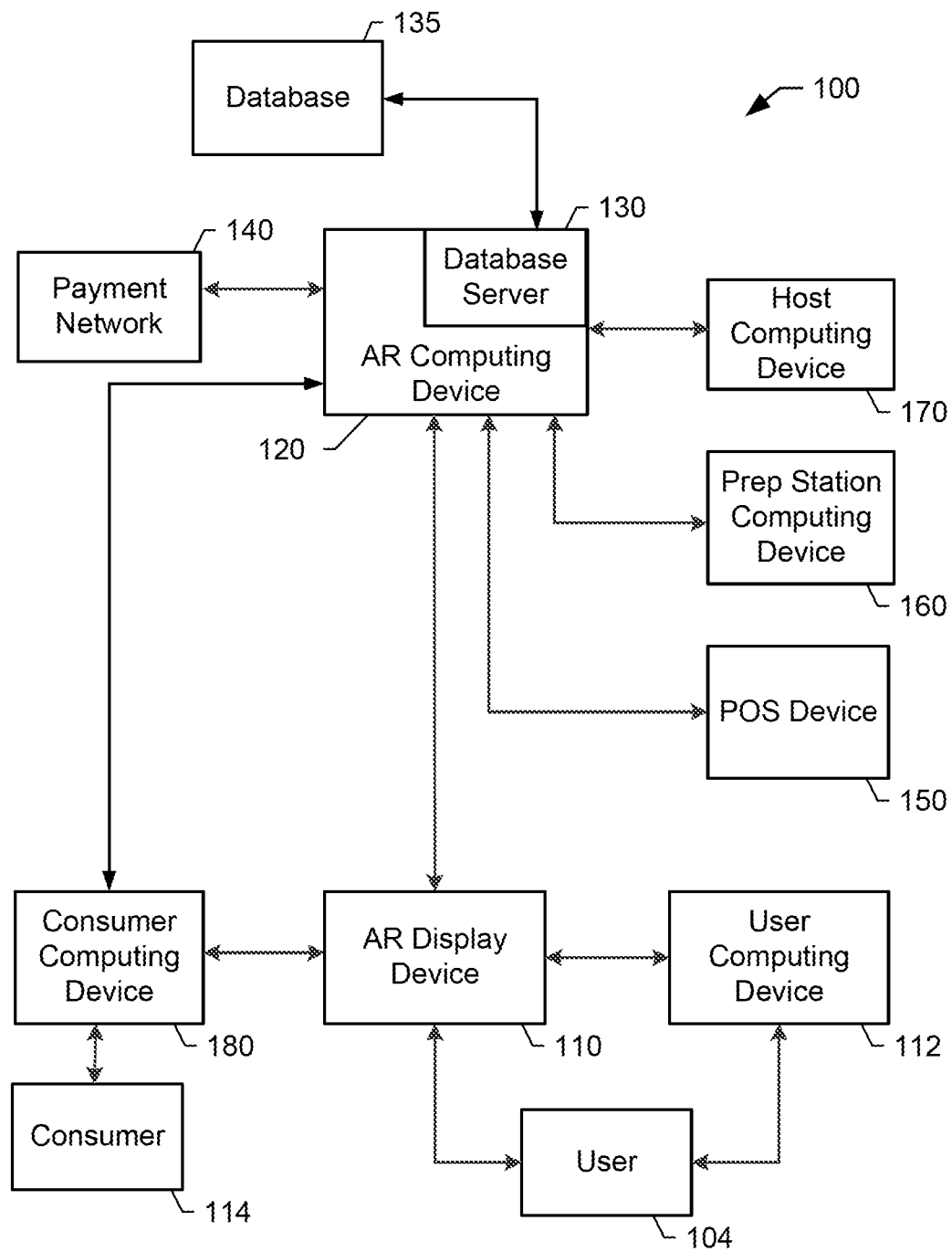
FIGS. 1-6 show example embodiments of the methods and systems described herein.

The present disclosure relates to an augmented reality (AR) system that is configured to receive data and display such data to a user using an augmented reality (AR) display device while the user is performing an activity. The AR system is also able to store one or more of the received data. The AR system displays the data as an overlay using as the background the location where the user is using the system (e.g., the user surroundings). The data may include real-time data transmitted from a computing device, user input data, and/or data stored in the AR system. The AR system may display the data in the form of computer-generated (CG) elements. As defined herein, real-time relates to the AR system processing data within a short period of time (e.g., from about milliseconds to minutes, or hours, as opposed to a matter of days) so that the data output and/or input is available virtually immediately.

In at least some implementations, the AR system includes an AR computing device that is in communication with a plurality of computing devices that include at least an augmented reality (AR) display device and a payment processor computing device. In other implementations, the AR computing device is in communication with other systems and/or computing devices within the AR system. For example, the AR computing device may include multiple devices, and thus, the AR display device may be in communication with a point-of-sale (POS) system, a security system, an entertainment system, a user computing device, or the like.

In the example embodiment, the AR display device includes a see-through, near-eye, mixed reality display device (e.g., HoloLens™ by Microsoft, Glass™ by Google) may also be referred to as an optical see-through display device, a video see-through display device, or a see-through holographic computing device. The AR display device is configured to display data to a user while the user is still able to see the real-environment where the user is located. In one embodiment, the AR display device is configured to receive data from multiple devices within the AR system, such as a tablet, a laptop, a wearable device, or a POS device. In addition, the AR display device may be able to receive data from a user computing device. In another embodiment, the AR display device is configured to receive data from an AR computing device associated with a service provider or a payment processor. In yet another embodiment, the AR display device is configured to receive data from a user of the AR display device via user eye movement, hand gestures, or other modes of data input.

The AR system may be implemented for a variety of service activities. Such activities may include car rental services, day care services, work out services, hospitality services, or any other service where a service provider interacts face-to-face with customers in real-time. For example, one such service may be in a restaurant environment.

In the example embodiment, the AR system is implemented in the hospitality industry (e.g., restaurant) and includes an AR computing device that is in communication with multiple computing devices, such as an AR display device and other computing devices used by merchants in the hospitality industry. In one embodiment, a user is equipped with the AR display device, such as the user may be a host or waiter in a restaurant who wears the AR display device (e.g., goggles or glasses) or otherwise holds the AR display device to be used as described herein. The AR display device is configured to display data (e.g., AR data) to the user as an overlay over the natural surroundings of the user. Thus, the user is able to see the AR displayed data while still viewing consumers, tables, chairs, and other items included within the user's surroundings along with the movement of all such items. The AR display device is configured to display the AR data by superimposing such data either on top, above, or near the consumer on the see-through display. The AR display device may be configured to display the AR data in the form of computer-generated (CG) elements. The AR data may include order data, seating data, preparation data (prep data), image data, or any other data that may be suitable to be displayed on the see-through display of the AR display device.

In some embodiments, the AR computing device is configured to display order data to a user using the AR display device. For example, the user may be a waiter equipped with the AR display device. The order data may include a table number, a section number, a consumer number, status of an order (e.g., whether the order is ready to be delivered to a table, time remaining for the order to be ready, etc.), a consumer order (e.g., food and/or drinks the consumer ordered), time an order was placed, elapsed time since the user interacted with a consumer (e.g., elapsed time since the user was at a table), or the like. In other embodiments, the AR computing device is configured to display prep data to the user using the AR display device. The prep data may include a time when the preparation of food or drinks starts within the restaurant, a time when the preparation is complete, an estimated length of preparation time, a list of out-of-stock items, or any such similar data related to the preparation of beverages and/or food within the restaurant. In yet other embodiments, the AR computing device is configured to display seating data to the user using the AR display device. The seating data may include a table number where a consumer is seating, a table number of an available table, the number of available tables, the name of a waiter responsible for a table, the number of consumers at a table, the order to which the tables should be seated, or the like.

In other embodiments, the AR computing device is configured to display image data to a user using the AR display device. For example, the AR computing device may be in communication with a security system included within or around the restaurant. The security system is configured to capture a video of a location that the user is interested in seeing (e.g., waiter's tables) and transmits the video to the AR computing device. The AR computing device transmits the video to the AR display device, which receives the video and displays it on the see-through display. Thus, the user would be able to view the activities occurring in a certain location even though the user is not directly positioned in that certain location (e.g., viewing activities from a remote location).

In certain embodiments, the AR display device is configured to receive data via a user's eye movement (e.g., certain eye movements are programmed to initiate certain functionality included within the AR display device). In other embodiments, the AR display device is configured to receive data via a user's hand gestures (e.g., tapping swiping, or input commands for the AR display device that are virtually displayed by the AR display device) or any other input modes detected by the AR display device. In yet other embodiments, the AR display device is configured to receive data from a user computing device. The user computing device may be a smartphone, personal computer, tablet computer, wearable devices, desktop, laptop, or similar computing device. In one embodiment, the user computing device is used by a waiter equipped with the AR display device. The waiter may input data, such as order data, into the user computing device which transmits the order data to the AR display device. The order data may include the food/beverage order for a consumer, the consumer number, the time of order entry, the order price, or the like. Alternatively or additionally, the waiter may use eye movement and/or hand gestures to transmit the order data to the AR display device. The AR display device transmits the order data to the AR computing device which in response transmits the order data to a preparation (prep) computing device, such as a computing device used in a prep station (e.g., kitchen, bar) to notify the prep station staff members of consumers' orders. In some embodiments, the prep computing device is similar to the user computing device.

In alternative embodiments, the AR display device is configured to receive data (e.g., AR data) from an AR computing device (e.g., AR server). In one embodiment, the AR display device may receive data from one or more computing devices in communication with the AR computing device. For example, a prep station staff member may input prep data into a prep computing device. In another example, a host may input seating data into a host computing device which may be similar to the prep computing device. The prep computing device and host computing device transmit the prep data and seating data, respectively, to the AR computing device which transmits such data to the AR display device. Subsequently, the AR display device displays such data to the user equipped with the AR display device. In another embodiment, the AR display device may receive data stored in a database in communication with AR computing device. Such data may include a table number (or other data for identifying tables or locations within a restaurant), a waiter name (or other identifying data for identifier waiters within a restaurant), or other data that may be stored in the database. In yet another embodiment, the AR display device may receive data from a POS device in communication with the AR computing device. For example, once a consumer has paid for an order, the POS device may transmit a notification of payment to the AR computing device. The notification of payment may be a flag that indicates to the AR computing device that the order is closed and a new consumer may be placed in the position where the consumer associated with the closed order was located. The AR computing device is configured to transmit the flag to the AR display device, which displays the position as an open position.

In other embodiments, the AR display device is configured to scan a consumer's face for future facial recognition and for associating an order with a person (e.g., a consumer). The AR display device includes a camera that may perform a scan of a consumer's face when the user equipped with the AR display device is positioned in front of the consumer's face. Once the AR display device scans the consumer's face, the AR display device transmits the consumer's face to the AR computing device, which stores the face (or some other value representing the face including a hashed or tokenized value sometimes referred to as "facial data") within a database for future facial recognition. The AR computing device is configured to assign to the consumer an identifier and is further configured to open a position for the consumer in a database table within or in communication with the AR computing device. In some embodiments, the AR computing device may use the position in the database table to enter the consumer's order (e.g., order data). After the AR computing device opens the position in the database table, the AR computing device enables the AR display device to enter the order data. The AR display device is configured to enter the order data by capturing facial data of the consumer and linking such facial data within the database to the order data. The AR display device may receive the order data via the user's eye movement and/or the user's hand gesture using CG elements. The AR display device may also receive the order data from a user computing device and/or a consumer computing device, which may be similar to the user computing device, in communication with the AR display device. After the AR display device receives the order data, the AR display device is configured to display at least a portion of the order data either on top, above, or near the consumer and transmits the order data to the AR computing device which transmits the order data to the prep station computing device. The AR display device is able to display the order data over each consumer based upon the linking of the order data to the facial data stored in the database.

At the time the AR display device transmits the order data to the AR computing device, the AR computing device may change the status of the status of the consumer's table to indicate that at least one order is pending for the table, and starts a timer to track the time that will take for the order to be ready. The AR computing device transmits the new status and the timer to the AR display device, which displays the status or the timer or both as CG elements above or near the table and/or consumer and above or near the prep station. In one embodiment, once a prep station computing device receives the order data, the prep station staff members may input into the prep station computing device the time that it will take for an order to be ready (e.g., time data included in the prep data). The prep station computing device may transmit the prep data to the AR computing device which transmits the time data to the AR display device. When the AR display device receives the prep data, the AR display device may display a CG element of the time that will take for an order to be ready above or near the prep station that is preparing the order.

In another embodiment, the AR computing device is configured to receive a notification when an order is ready. Prep station staff members change the status of the order (e.g., status order data) using the prep station computing device. The prep station computing device transmits the status order data to the AR computing device which transmits the status order data to the AR display device. Once the AR display device receives the status order data, the AR display device displays a CG element of the received status order data above or near the prep station, a consumer's table, and/or a consumer enabling the user to know that the order is ready to be picked up. Further, because the AR display device is configured to display order data as an overlay on top (or otherwise near) of each consumer via saved facial recognition, the user delivering the order to the table is able to identify the order corresponding to each consumer.

In yet another embodiment, the AR computing device is configured to receive data associated with the status of a table (e.g., status data). The status data may include the time an event occurred at a table (e.g., the time a user delivered an item to a consumer, such as a napkin, a beverage, or any other item the user may deliver to or pick up from the consumer), a type of item associated with the event (e.g., the type of item that the user delivered to or picked up from the consumer), or the like. In one example, the AR display device captures status data by scanning the movements of the user and then transmits the status data to the AR computing device. The AR computing device is configured to store the status data, and track the time an event occurred and the type item associated with that event.

In certain embodiments, the AR computing device is configured to receive transaction data from the AR display device, which receives such data from a consumer computing device. In other embodiments, the AR computing device is configured to receive transaction data from a consumer computing device that is in communication with the AR computing device. When a consumer is ready to pay, the consumer computing device may transmit transaction data to the AR display device or directly to AR computing device via an electronic payment application, such as Qkr!™ by MasterCard®, MasterPass™ by Mastercard®, and/or any other suitable digital wallet compatible with the AR computing device. Once the AR computing device receives the transaction data, the AR computing device may transmit such data to a POS device, so that an authorization request message may be sent to a payment processor computing device, and/or any computing device that is in communication with the payment network. The AR computing device is also configured to transmit an authorization response message to the AR display device, so that a user is notified that a payment transaction for a consumer is authorized or declined (e.g., ISO® 8583 compliant messages and ISO® 20022 compliant messages).

In other embodiments, the AR computing device is configured to transmit different AR data to the AR display device based on the type of user equipped with the AR display device. For example, the user equipped with the AR display device may be a restaurant manager. The AR display device is configured to display to the restaurant manager additional AR data that is not displayed to other users, such as waiters. The additional AR data may include the time each table has been waiting for its order to be delivered, the time each table has been waiting for its check, the name of each waiter working during a shift, the number of consumers in the restaurant, the total amount of gratuity each waiter has received, the total amount of sales for the restaurant and/or each waiter during a shift, consumers' comments (e.g., comments or complaints captured by a waiter's AR display device), or the like. The AR display device is also configured to record and analyze verbal interactions. The AR display device is further configured to determine the type of verbal interaction that was recorded and automatically transmit the recorded verbal interaction to the AR computing device, which may transmit the recorded verbal interaction to another AR display device (e.g., an AR display device used by a manager). For example, a user equipped with the AR display device, such as a waiter, may have a conversation with a consumer. During the conversation, the AR display device may record and analyze the conversation. By performing an analysis of the conversation (e.g., word comparison to designated words stored in the database, sentiment analysis, other word or tone analysis, or the like), the AR display device may determine that the conversation involves a consumer complaint and, based on such determination, automatically transmits the conversation to a manager's AR display device via the AR computing device.

In yet other embodiments, the AR computing device is configured to receive and store recordings, such as videos and/or audios, captured by the AR display device. The recordings may include interactions between the user equipped with the AR display device and one or more consumers. The recordings may also include interactions between the user equipped with the AR display device and any other person such user may interact with (e.g., prep station staff, wait staff, host staff, manager staff, suppliers, or the like). The stored recordings may be used for later review. For example, the recordings may be used for training, service improvement, potential payment dispute settlements (e.g., consumers and/or suppliers payment dispute settlements), or any other suitable use the users of the AR computing device may find.

The methods and system described herein may be implemented using computer programming or engineering techniques including computer software, firmware, hardware, or any combination or subset. As disclosed above, at least one technical problem with prior systems is they are unable to use AR's various capabilities to improve customer service while performing a service activity. There is a need to enhance the customer service awareness of a retail staff, such as a wait staff, and consequently provide a more seamless dining experience for consumers. The systems and methods described herein address that technical problem. The technical effect of the systems and processes described herein is achieved by performing at least one of the following steps: (a) scanning a first location, using an AR display device in communication with the AR computing device, to capture location data, wherein location data includes consumer data corresponding to one or more consumers and facial data associated with the one or more consumers, (b) selecting, using an input entered into the AR display device, a first consumer of the one or more consumers scanned at the first location, (c) storing the consumer data corresponding to the first consumer in a database, (d) receiving AR data associated with the location data including the consumer data corresponding to the first consumer, (e) automatically displaying, using the AR display device, the AR data, wherein the AR data is overlaid over one or more objects, (g) receive an update for the AR data, (h) automatically updating the AR data in response to the received update and (h) displaying, using the AR display device, the updated AR data.

The methods and systems described herein provide at least some technical improvements to known service providers computing systems. For example, the present system provides real-time data to a user providing the service to at least one consumer, stores the data linked to each individual consumer for easier data retrieval and service provisioning. Some of the benefits of these methods and systems include improvement of customer service while performing a service activity, enhancement of the customer service awareness of a retail staff, such as a wait staff, and consequently provisioning a more seamless dining experience for consumers.

In one embodiment, a computer program is provided, and the program is embodied on a computer-readable medium. In an example embodiment, the system is executed on a single computer system, without requiring a connection to a service provider computing device computer. In a further example embodiment, the system is being run in a Windows® environment (Windows is a registered trademark of Microsoft Corporation, Redmond, Wash.). In yet another embodiment, the system is run on a mainframe environment and a UNIX® service provider computing device environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Service provider computing device, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

In some embodiments, the consumer data and/or facial data are anonymized and aggregated (e.g., by the user computing device and/or the AR display device) prior to receipt by the AR computing device (i.e., no personally identifiable information (PII) is received by the AR computing device). In other embodiments, the AR computing device may be configured to receive the consumer data and/or the facial data without yet being anonymized and/or aggregated, and thus the AR computing device may be configured to anonymize and aggregate the consumer data and/or the facial data. In such embodiments, any PII received by the AR computing device is received and processed in an encrypted format, or is received with the consent of individuals with which the PII is associated. In situations in which the systems discussed herein collect personal information about individuals including users and/or consumers, or may make use of such personal information, individuals may be provided with an opportunity to control whether such information is collected or to control whether and/or how such information is used. In addition, certain data may be processed in one or more ways before it is stored or used, so that personally identifiable information is removed.

FIG. 1 is a simplified block diagram of an example augmented reality (AR) system 100, in which a variety of computing devices are communicatively coupled to each other via a plurality of network connections. These network connections may be Internet, LAN/WAN, Bluetooth™, Wi-Fi, or other connections capable of transmitting data across computing devices. AR system 100 includes augmented reality (AR) display device 110, augmented reality (AR) computing device 120, and database 135. In one embodiment, AR display device 110 and database 135 are components of AR computing device 120. AR computing device 120 may be a service provider computing device, a network of multiple computer devices, a virtual computing device, or the like. AR computing device 120 is connected to at least one payment network 140. AR computing device 120 may be in communication with other systems and/or computing devices, such as AR display device 110 and other computing devices used by merchants in the hospitality industry. In the example embodiment, AR computing device 120 is in communication with POS device 150, prep station computing device 160, and host computing device 170. In the example embodiment, AR computing device 120 receives data from and transmits data to AR display device 110, POS device 150, prep station computing device 160, and host computing device 170.

Database server 130 is connected to database 135, which contains information on a variety of matters, as described below in greater detail. In one embodiment, database 135 is stored on AR computing device 120 and can be accessed by potential users of AR computing device 120. In an alternative embodiment, database 135 is stored remotely from AR computing device 120 and may be non-centralized. Database 135 may include a single database having separated sections or partitions or may include multiple databases, each being separate from each other. Database 135 is in communication with AR display device 110 via AR computing device 120 and may store data associated with consumer's 114 order.

AR display device 110 is configured to receive AR data 210 (shown in FIG. 2) from user 104. User 104 may input AR data 210 via user computing device 112, user's hand gestures, and/or user's eye movement (e.g., certain eye movements are programmed to initiate certain functionality included within AR display device 110). AR display device 110 is also configured to scan the face of consumer 114 for future facial recognition of consumer 114 and for associating an order with consumer 114. AR display device 110 includes a camera that may perform a scan of consumer's 114 face when user 104 equipped with AR display device 110 is positioned in front of consumer's 114 face. Once AR display device 110 scans consumer's 114 face, AR display device 110 transmits consumer's 114 face to AR computing device 120, which stores the face (or some other value representing the face including a hashed or tokenized value sometimes referred to as "facial data") within, for example, database 135 for future facial recognition. AR computing device 120 is configured to assign to consumer 114 an identifier and is further configured to open a position for consumer 114 in a database table of, for example, database 135 within or in communication with AR computing device 120.

After AR computing device 120 opens the position in the database table, AR computing device 120 enables AR display device 110 to enter order data. AR display device 110 is configured to enter the order data by capturing facial data of consumer 114 and linking such facial data within database 135 to the order data. AR display device 110 may receive the order data via user's 104 eye movement and/or user's 104 hand gesture using computer-generated (CG) elements. AR display device 110 may also receive the order data from user computing device 112 and/or a consumer computing device 180, which may be similar to user computing device 112, in communication with AR display device 110. After AR display device 110 receives the order data, AR display device 110 is configured to display at least a portion of the order data either on top, above, or near consumer 114 and transmits the order data to AR computing device 120 which transmits the order data to prep station computing device 160. AR display device 110 is able to display the order data over each consumer 114 based upon the linking of the order data to the facial data stored in database 135.

At the time AR display device 110 transmits the order data to AR computing device 120, AR computing device 120 may change the status of consumer's 114 table to indicate that at least one order is pending for the table, and starts a timer to track the time that will take for the order to be ready. AR computing device 120 transmits the new status and the timer to AR display device 110, which displays the status or the timer or both as CG elements above or near the table and/or consumer 114 and above or near a prep station. In one embodiment, once prep station computing device 160 receives the order data, the prep station staff members may input into prep station computing device 160 the time that it will take for an order to be ready (e.g., time data included in the prep data). Prep station computing device 160 may transmit the prep data to AR computing device 120 which transmits the time data to AR display device 110. When AR display device 110 receives the prep data, AR display device 110 may display a CG element of the time that will take for an order to be ready above or near the prep station that is preparing the order.

AR computing device 120 is also configured to receive a notification when an order is ready. Prep station staff members change the status of the order (e.g., status order data) using prep station computing device 160. Prep station computing device 160 transmits the status order data to AR computing device 120 which transmits the status order data to AR display device 110. Once AR display device 110 receives the status order data, AR display device 110 displays a CG element of the received status order data above or near the prep station, consumer's 114 table, and/or consumer 114 enabling user 104 to know that the order is ready to be picked up. Further, because AR display device 110 is configured to display order data as an overlay on top (or otherwise near) of each consumer 114 via saved facial recognition, user 104 delivering the order to the table is able to identify the order corresponding to each consumer 114.

AR display device 110 is further configured to capture movements of user 104, such as user 104 delivering a napkin to consumer 114, user 104 picking up a plate from a table where consumer 114 is sitting, or other duties user 104 may perform. AR display device 110 is also configured to transmit the scanned face of consumer 114 and the movements of user 104 to AR computing device 120, which is configured to store the transmitted data from AR display device 110.

AR display device 110 is also configured to receive transaction data from consumer computing device 180 which may be similar to user computing device 112. When consumer 114 is ready to pay, consumer computing device 180 may transmit transaction data to AR display device 110, which transmits such data to AR computing device 120, or directly to AR computing device 120 if consumer computing device 180 is in communication with AR computing device 120. Consumer computing device 180 may transmit transaction data via an electronic payment application, such as Qkr!™ by Mastercard®, MasterPass™ by Mastercard®, and/or any other suitable digital wallet compatible with AR computing device 120. Once AR computing device 120 receives the transaction data, AR computing device 120 may transmit such data to POS device 150, so that an authorization request message may be sent to a payment processor computing device, and/or any computing device that is in communication with payment network 140. AR display device 110 is further configured to receive an authorization response message from AR computing device 120, so that user 104 is notified that a payment transaction for consumer 114 is authorized or declined (e.g., ISO® 8583 compliant messages and ISO® 20022 compliant messages).

Figure 2:
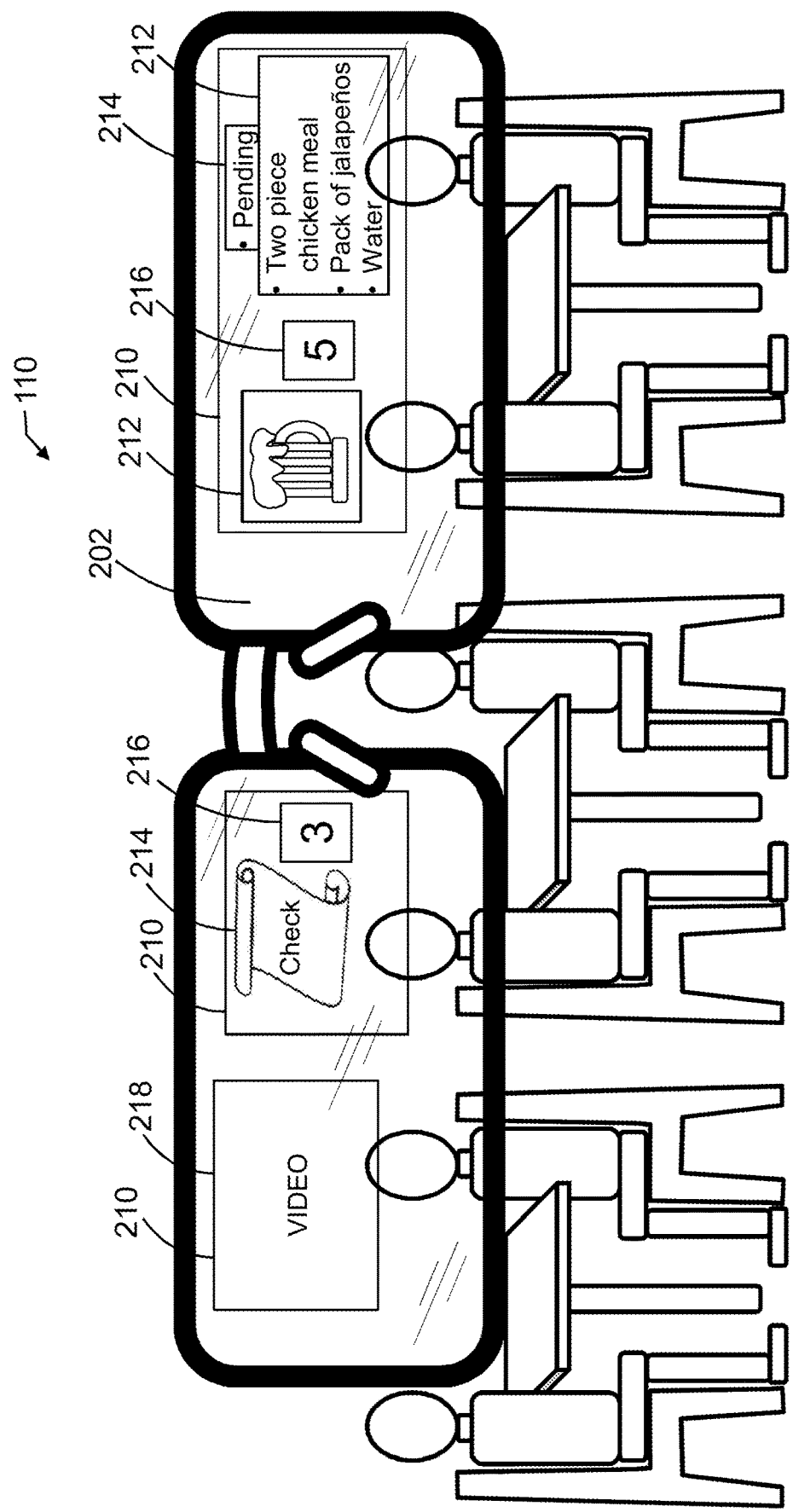

FIG. 2 is an exemplary view of user 104 (shown in FIG. 1) equipped with AR display device 110. AR display device 110 is configured to display augmented reality (AR) data 210 to user 104 as an overlay over the natural surroundings of user 104. Thus, user 104 is able to see AR data 210 while still viewing consumers, tables, chairs, and other items included within user's 104 surroundings along with the movement of all such items. AR display device 110 is configured to display AR data 210 to user 104 while user 104 is still able to see the real-environment where user 104 is located. In certain embodiments, AR display device 110 is configured to display AR data 210 to user 104 using computer-generated (CG) elements. AR display device 110 displays AR data 210 by superimposing AR data 210 either on top, above, or near to consumer 114 on see-through display 202. AR data 210 may include order data 212, preparation data (prep data) 214, seating data 216, image data 218, or any other data that may be suitable to be displayed on see-through display 202 of AR display device 110.

In some embodiments, AR display device 110 displays order data 212 to user 104. User 104 may be a waiter equipped with AR display device 110. Order data 212 may include a table number, a section number, a consumer number, status of an order (e.g., whether the order is ready to be delivered to a table, time remaining for the order to be ready, etc.), a consumer order (e.g., food and/or drinks the consumer ordered), time an order was placed, elapsed time since user 104 interacted with a consumer (e.g., elapsed time since the user was at a table), or the like. In other embodiments, AR display device 110 displays preparation data (prep data) 214 to user 104. Prep data 214 may include the time preparation starts, the time preparation is complete, estimate preparation time, out-of-stock items, or any similar data related to the preparation of beverages and/or food. In yet other embodiments, AR display device 110 displays seating data 216 to user 104. Seating data 216 may include a table number where a consumer is seating, a table number of an available table, the number of available tables, the name of a waiter responsible for a table, the number of consumers at a table, the order to which the tables should be seated, or the like.

In other embodiments, AR display device 110 is configured to display image data 218 to user 104. For example, AR computing device 120 (shown in FIG. 1) may be in communication with a security system. The security system captures a video of a location that user 104 is interested in seeing (e.g., waiter's tables) and transmits the video to AR computing device 120. AR computing device 120 transmits the video to AR display device 110, which receives the video and displays it using see-through display 202 to user 104. Thus, user 104 would be able to view the activities occurring in a certain location even though user 104 is not directly positioned in that certain location (e.g., viewing activities from a remote location).

Figure 3:
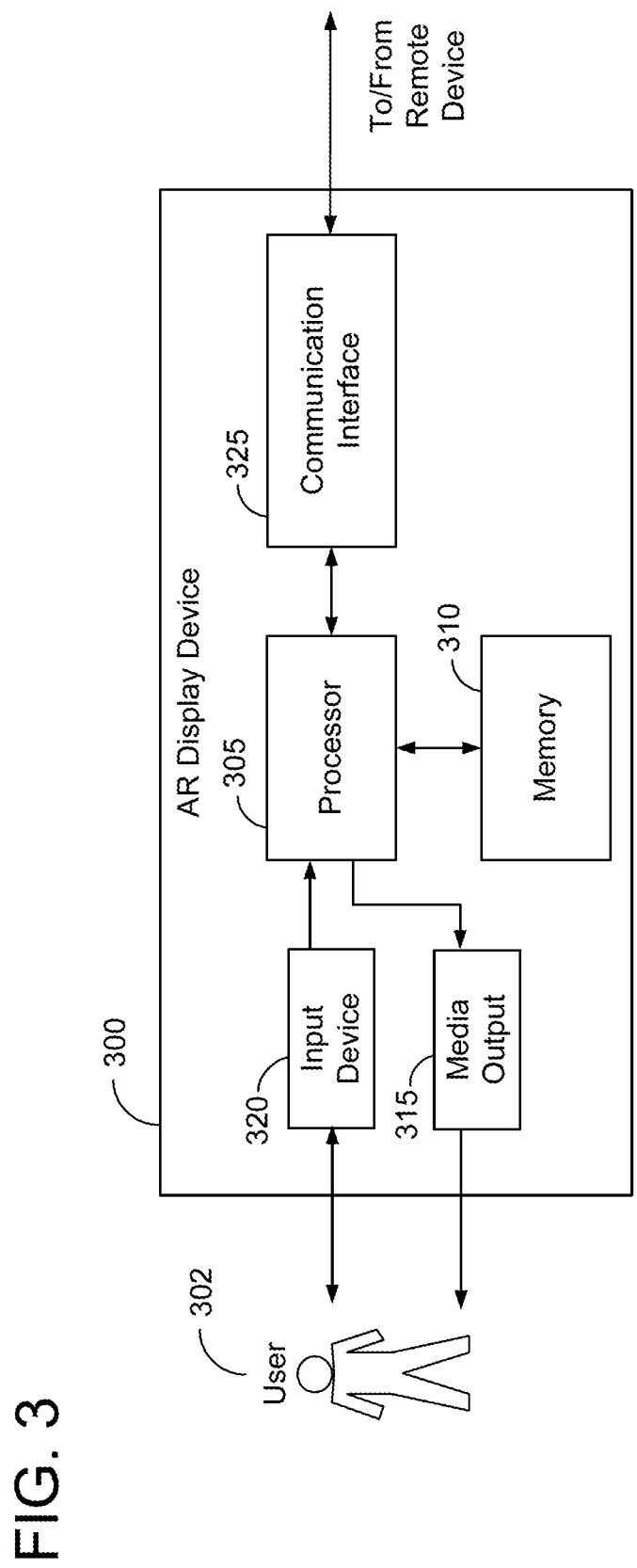

FIG. 3 illustrates an example configuration of an AR display device 300, such as AR display device 110 (shown in FIG. 1), configured to display AR data, such as CG elements. In the example embodiment, AR display device 300 includes a processor 305 for executing instructions. In some embodiments, executable instructions are stored in a memory 310. Processor 305 may include one or more processing units, for example, a multi-core configuration. Memory 310 is any device allowing information such as executable instructions and/or written works to be stored and retrieved. Memory 310 may include one or more computer readable media.

AR display device 300 also includes at least one media output component 315 for presenting information to user 302. User 302 may include, but is not limited to, user 104 (shown in FIG. 1). Media output component 315 is any component capable of conveying information to user 302. For example, media output component 315 may be a display component, such as see-through display 202 (shown in FIG. 2), configured to display AR data in the form of CG elements. In some embodiments, media output component 315 includes an output adapter such as a video adapter and/or an audio adapter. An output adapter is operatively coupled to processor 305 and operatively connectable to an output device such as a display device, a liquid crystal display (LCD), organic light emitting diode (OLED) display, or "electronic ink" display, or an audio output device, a speaker or headphones.

In some embodiments, AR display device 300 includes an input device 320 for receiving input from user 302. Input device 320 may include, for example, a keyboard, a pointing device, a mouse, a stylus, a touch sensitive panel, a touch pad, a touch screen, a gyroscope, an accelerometer, a position detector, an audio input device, a fingerprint reader/scanner, a palm print reader/scanner, a iris reader/scanner, a retina reader/scanner, a profile scanner, a hand gesture reader/scanner, or the like. A single component, such as a touch screen, may function as both an output device of media output component 315 and input device 320. AR display device 300 may also include a communication interface 325, which is communicatively connectable to a remote device such as AR computing device 120 (shown in FIG. 1). Communication interface 325 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory 310 are, for example, computer readable instructions for providing a user interface to user 302 via media output component 315 and, optionally, receiving and processing input from input device 320. A user interface may include, among other possibilities, a web browser and client application. Web browsers enable users, such as user 302, to display and interact with media and other information typically embedded on a web page or a website from AR computing device 120. A client application allows user 302 to interact with an AR computing device application from AR computing device 120.

Figure 4:
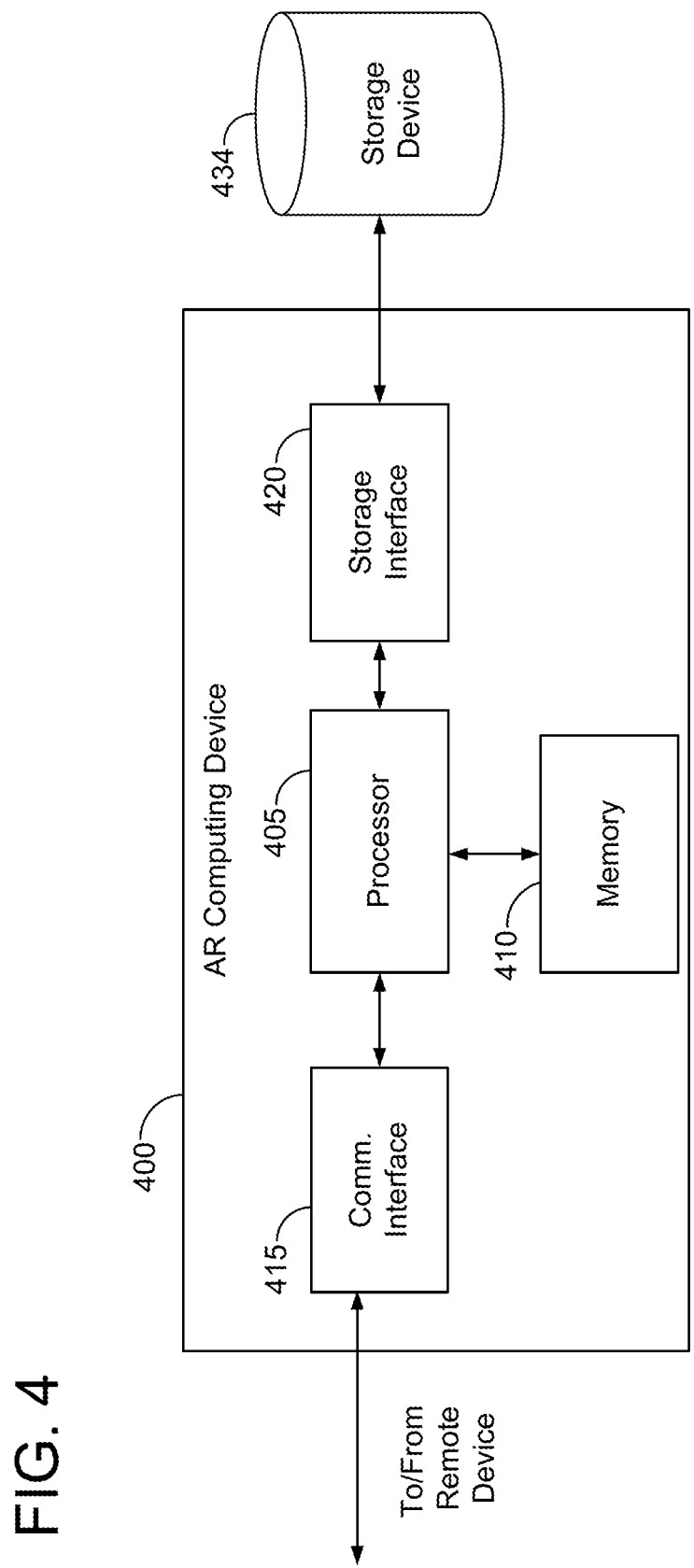

FIG. 4 illustrates an example configuration of an AR computing device 400, such as AR computing device 120 (shown in FIG. 1). AR computing device 400 may include, but is not limited to, database server 130 (shown in FIG. 1). In some embodiments, AR computing device 400 is similar to AR computing device 120.

AR computing device 400 includes a processor 405 for executing instructions. Instructions may be stored in a memory 410, for example. Processor 405 may include one or more processing units (e.g., in a multi-core configuration) for executing instructions. The instructions may be executed within a variety of different operating systems on the AR computing device 400, such as UNIX, LINUX, Microsoft Windows®, etc. More specifically, the instructions may cause various data manipulations on data stored in storage device 434 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 405 is operatively coupled to a communication interface 415 such that AR computing device 400 is capable of communicating with a remote device, such as a user system or another AR computing device 400. For example, communication interface 415 may receive communications from payment network 140 (shown in FIG. 1) via the Internet.

Processor 405 may also be operatively coupled to a storage device 434. Storage device 434 is any computer-operated hardware suitable for storing and/or retrieving data. In some embodiments, storage device 434 is integrated in AR computing device 400. In other embodiments, storage device 434 is external to service provider AR computing device 400 and is similar to database server 130. For example, AR computing device 400 may include one or more hard disk drives as storage device 434. In other embodiments, storage device 434 is external to AR computing devices 400 and may be accessed by a plurality of AR computing device 400. For example, storage device 434 may include multiple storage units such as hard disks or solid state disks in a redundant array of inexpensive disks (RAID) configuration. Storage device 434 may include a storage area network (SAN) and/or a network attached storage (NAS) system.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Memory 410 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
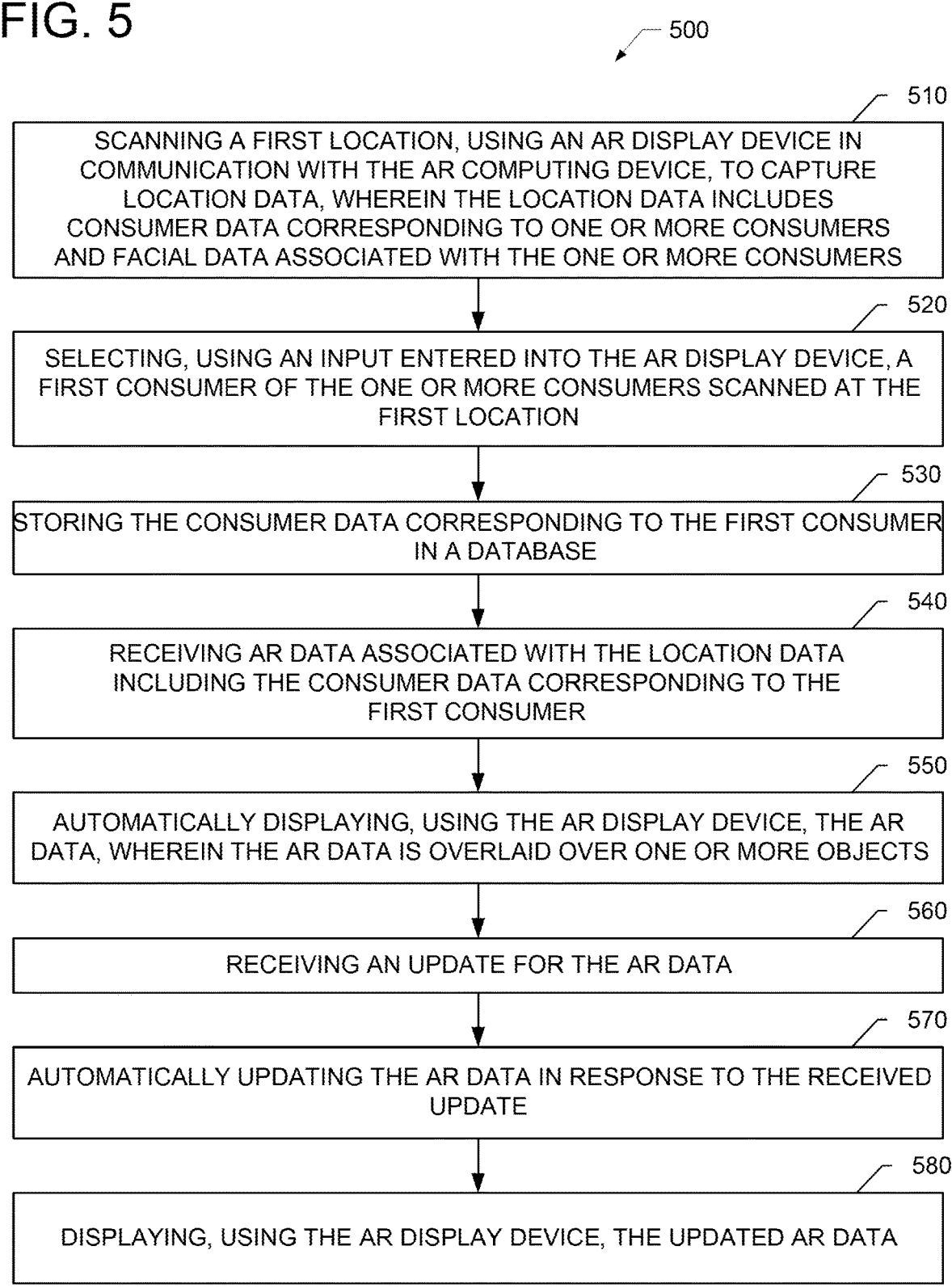

FIG. 5 is an example flow diagram illustrating a method flow 500 by which AR computing device 120 (shown in FIG. 1) uses augmented reality functionality to display computer-generated elements to support service activities. Method 500 includes scanning 510 a first location, using an AR display device in communication with the AR computing device, to capture location data, wherein the location data includes consumer data corresponding to one or more consumers and facial data associated with the one or more consumers. The method also includes selecting 520, using an input entered into the AR display device, a first consumer of the one or more consumers scanned at the first location, storing 530 the consumer data corresponding to the first consumer in a database, and receiving 540 AR data associated with the location data including the consumer data corresponding to the first consumer. The method further includes automatically displaying 550, using the AR display device, the AR data, wherein the AR data is overlaid over one or more objects, receiving 560 an update for the AR data, automatically updating 570 the AR data in response to the received update, and displaying 580, using the AR display device, the updated AR data.

Figure 6:
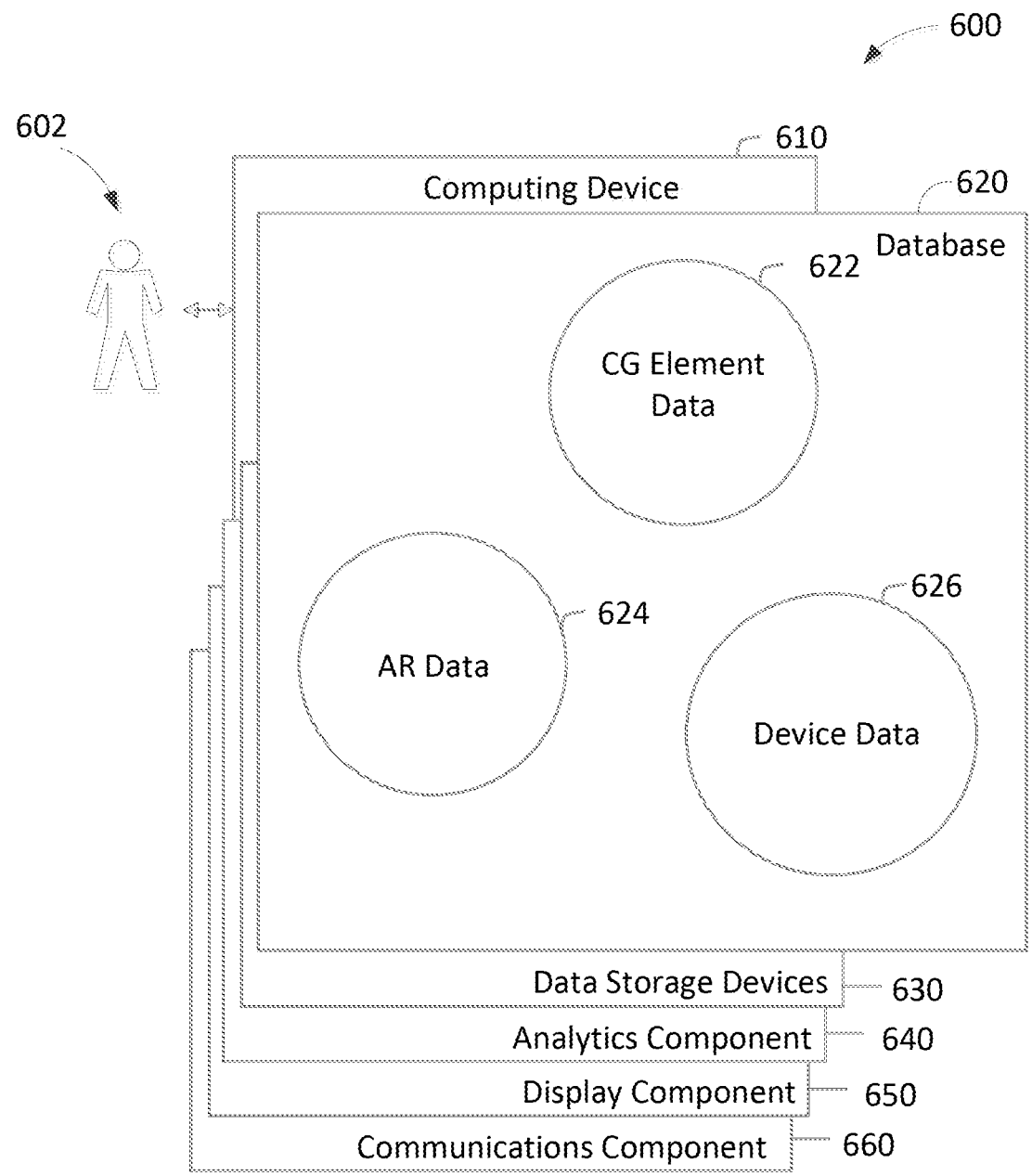

FIG. 6 shows an example database configuration 600 within a computer device, along with other related computer components, that may be used to generate and display CG elements using AR data. In some embodiments, computer device 610 is similar to AR computing device 120 (shown in FIG. 1). Operator 602 (such as a user operating AR computing device 120) may access computer device 610 in order to manage AR-based service delivery for one or more other users (such as the users entering and/or viewing CG element data using AR computing device 120). In some embodiments, database 620 is similar to database 135 (shown in FIG. 1). In the example embodiment, database 620 includes CG element data 622, AR data 624, and device data 626. CG element data 622 includes data relating to current and prior computer-generated elements (e.g., recorded images of CG elements, resolutions, pixel values, color values, size values, associations with specific users, or the like). AR data 624 includes data associated with users that communicate with AR computing device 120 using, for example, AR display device 110 (shown in FIG. 1). AR data 624 may include order data, seating data, prep data, image data, or any other data that may be suitable to be displayed on see-through display 202 (shown in FIG. 2) of AR display device 110. Device data 626 includes data relating to devices such as AR display device 110, camera devices, POS device 150, prep station computing device 160, host computing device 170, or any other device in communication with AR computing device 120.

Computer device 610 also includes data storage devices 630. Computer device 610 also includes analytics component 640 that assists in generating CG elements. Computer device 610 also includes display component 650 that can be used by operator 602 to view the status of AR computing device 120. Computer device 610 also includes communications component 660 which is used to communicate with remote computer devices (e.g., an AR display device). In one embodiment, communications component 660 is similar to communications interface 325 (shown in FIG. 3).

The computer systems and computer-implemented methods discussed herein may include additional, less, or alternate actions and/or functionalities, including those discussed elsewhere herein. The computer systems may include or be implemented via computer-executable instructions stored on non-transitory computer-readable media. The methods may be implemented via one or more local or remote processors, transceivers, servers, and/or sensors (such as processors, transceivers, servers, and/or sensors mounted on mobile computing devices, or associated with smart infrastructure or remote servers), and/or via computer executable instructions stored on non-transitory computer-readable media or medium.

In some embodiments, a processor included in an AR system, such as a processor associated with an AR computing device and/or AR display device, is configured to implement machine learning, such that the processor "learns" to analyze, organize, and/or process data without being explicitly programmed. Machine learning may be implemented through machine learning (ML) methods and algorithms. In an exemplary embodiment, a machine learning (ML) module associated with a processor is configured to implement ML methods and algorithms. In some embodiments, ML methods and algorithms are applied to data inputs and generate machine learning (ML) outputs. Data inputs may include but are not limited to: AR data, order data, preparation data, seating data, image data, location data, CG element data, device data, user hand gestures, user eye movement, other user movements, a consumer's face (e.g., facial data), order status, order preparation data, kitchen staff data, employee status, voice recording, image or video, user preferences, user profile data, and transaction data. Data inputs may further include: sensor data, authentication data, authorization data, security data, mobile device data, geolocation information, and/or personal identification data. ML outputs may include but are not limited to: AR data, consumer identification, user gesture and movement recognition, order timing, preparation tracking, and user recognition. ML outputs may further include: speech recognition, image or video recognition, fraud detection analysis, user recommendations and personalization, skill acquisition, and/or information extracted about a computer device, a user, a home, or a party of a transaction. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, ML methods and algorithms are directed toward supervised learning, which involves identifying patterns in existing data to make predictions about subsequently received data. Specifically, ML methods and algorithms directed toward supervised learning are "trained" through training data, which includes example inputs and associated example outputs. Based on the training data, the ML methods and algorithms may generate a predictive function which maps outputs to inputs and utilize the predictive function to generate ML outputs based on data inputs. The example inputs and example outputs of the training data may include any of the data inputs or ML outputs described above. For example, a ML module may receive training data including user hand gestures and user eye movements along with an associated desired action, generate a model which maps desired actions to user hand gestures and user eye movement, and generate a ML output including a desired action for subsequently received data inputs including user hand gestures and user eye movement.

In another embodiment, ML methods and algorithms are directed toward unsupervised learning, which involves finding meaningful relationships in unorganized data. Unlike supervised learning, unsupervised learning does not involve user-initiated training based on example inputs with associated outputs. Rather, in unsupervised learning, unlabeled data, which may be any combination of data inputs and/or ML outputs as described above, is organized according to an algorithm-determined relationship. In an exemplary embodiment, a ML module receives unlabeled data including order status data, order preparation data, and kitchen staff data. The ML module further employs an unsupervised learning method such as "clustering" to identify patterns and organize the unlabeled data into meaningful groups. The newly organized data may be used, for example, to determine an average time for a new order.

In yet another embodiment, ML methods and algorithms are directed toward reinforcement learning, which involves optimizing outputs based on feedback from a reward signal. Specifically, ML methods and algorithms directed toward reinforcement learning may receive a user-defined reward signal definition, receive a data input, utilize a decision-making model to generate a ML output based on the data input, receive a reward signal based on the reward signal definition and the ML output, and alter the decision-making model so as to receive a stronger reward signal for subsequently generated ML outputs. The reward signal definition may be based on any of the data inputs or ML outputs described above. In an exemplary embodiment, a ML module implements reinforcement learning in generating alerts or notifications for a user. The ML module may utilize a decision-making model to recommend a certain action to a user and my receive consumer facial recognition data when the user carries out the recommended action. A reward signal may be generated based on consumer satisfaction, determined by facial recognition, in response to the recommended action. The ML module may update the decision-making model such that subsequently generated recommended actions are more likely to create consumer satisfaction.

As will be appreciated based on the foregoing specification, the above-described embodiments of the disclosure may be implemented using computer programming or engineering techniques including computer software, firmware, hardware or any combination or subset thereof, wherein the technical effect is to display CG elements to a user to improve customer service while performing a service activity, enhancing the customer service awareness of a retail staff, such as a wait staff, and consequently providing a more seamless dining experience for consumers. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An augmented reality (AR) computing device for displaying computer-generated elements in augmented reality supported service activities, the AR computing device in communication with an AR display device, at least one prep station computing device, and at least one host computing device, the AR computing device comprising at least one processor and a memory, the AR computing device configured to:

receive prep data from the at least one prep station computing device associated with a prep station;

receive seating data from the at least one host computing device;

scan, via the AR display device, a location including one or more consumers to capture facial data corresponding to the one or more consumers, the facial data including a face of each of the one or more consumers;

select, using an input entered into the AR display device, a first consumer of the one or more consumers scanned at the location;

store the facial data corresponding to the first consumer in a database;

receive AR data associated with the facial data corresponding to the first consumer;

automatically cause to be displayed, via the AR display device, the AR data, wherein the AR data is overlaid over one or more objects on at least one of a see-through display, a near-eye display, and a mixed reality display;

receive order data from the AR display device;

receive an update for the AR data;

automatically update the AR data in response to the received update; and cause to be displayed, via the AR display device, the updated AR data.

2. The AR computing device of claim 1, wherein the AR computing device is further configured to assign an identifier to the first consumer.

3. The AR computing device of claim 1, wherein the AR computing device is further configured to store, within the database, the facial data corresponding to a second consumer, wherein the second consumer is seating at a table where the first consumer is seating.

4. The AR computing device of claim 1, wherein the AR computing device is further configured to cause to be displayed, via the AR display device, the AR data at a position relative to the scanned location, wherein the position is at least one of above and near the scanned location.

5. The AR computing device of claim 1, wherein the AR computing device is further configured to select the AR data displayed on the AR display device using one or more predefined settings associated with the AR display device.

6. The AR computing device of claim 1, wherein the AR computing device is further configured to:

start a timer tracking a time required for an order to be ready, the order associated with the order data; and cause to be displayed, via the AR display device, the timer at a position relative to the scanned location, wherein the position is at least one of above and near the prep station.

7. The AR computing device of claim 1, wherein the AR computing device is further configured to:

receive a video from a security system, the video including a table where the first consumer is seated; and cause to be displayed, via the AR display device, the video to a user of the AR display device.

8. A computer-implemented method for displaying computer-generated elements in augmented reality supported service activities, the method implemented using an augmented reality (AR) computing device in communication with an AR display device, at least one prep station computing device, and at least one host computing device, the AR computing device coupled to a memory device, the method comprising:

receiving prep data from the at least one prep station computing device associated with a prep station;

receiving seating data from the at least one host computing device;

scanning, via the AR display device, a location including one or more consumers to capture facial data corresponding to the one or more consumers, the facial data including a face of each of the one or more consumers;

selecting, using an input entered into the AR display device, a first consumer of the one or more consumers scanned at the location;

storing the facial data corresponding to the first consumer in a database;

receiving AR data associated with the facial data corresponding to the first consumer;

automatically causing to be displayed, via the AR display device, the AR data, wherein the AR data is overlaid over one or more objects on at least one of a see-through display, a near-eye display, and a mixed reality display;

receiving order data from the AR display device;

receiving an update for the AR data;

automatically updating the AR data in response to the received update; and causing to be displayed, via the AR display device, the updated AR data.

9. The method of claim 8 further comprising assigning an identifier to the selected first consumer.

10. The method of claim 8 further comprising storing, within the database, the facial data corresponding to a second consumer, wherein the second consumer is seating at a table where the first consumer is seating.

11. The method of claim 8 further comprising causing to be displayed, via the AR display device, the AR data at a position relative to the scanned location, wherein the position is at least one of above and near the scanned location.

12. The method of claim 8 further comprising selecting the AR data displayed on the AR display device using one or more predefined settings associated with the AR display device.

13. The method of claim 8 further comprising, further comprising:

starting a timer tracking a time required for an order to be ready, the order associated with the order data; and causing to be displayed, via the AR display device, the timer at a position relative to the scanned location, wherein the position is at least one of above and near the prep station.

14. The method of claim 8 further comprising, further comprising:

receiving a video from a security system, the video including a table where the first consumer is seated; and causing to be displayed, via the AR display device, the video to a user of the AR display device.

15. A non-transitory computer-readable medium that includes computer-executable instructions for asynchronous data consolidation and transmission over a computer network, wherein when executed by an augmented reality (AR) computing device in communication with an AR display device, at least one prep station computing device, and at least one host computing device, the AR computing device comprising at least one processor in communication with at least one memory device, the computer-executable instructions cause the AR computing device to:

receive prep data from the at least one prep station computing device associated with a prep station;

receive seating data from the at least one host computing device;

scan, via the AR display device, a location including one or more consumers to capture facial data corresponding to the one or more consumers, the facial data including a face of each of the one or more consumers;

select, using an input entered into the AR display device, a first consumer of the one or more consumers scanned at the location;

store the facial data corresponding to the first consumer in a database;

receive AR data associated with the facial data corresponding to the first consumer;

automatically cause to be displayed, via the AR display device, the AR data, wherein the AR data is overlaid over one or more objects on at least one of a see-through display, a near-eye display, and a mixed reality display;

receive order data from the AR display device;

receive an update for the AR data;

automatically update the AR data in response to the received update; and cause to be displayed, via the AR display device, the updated AR data.

16. The computer-readable medium of claim 15, wherein the computer-executable instructions further cause the AR computing device to assign an identifier to the selected first consumer.

17. The computer-readable medium of claim 15, wherein the computer-executable instructions further cause the AR computing device to store, within the database, the facial data corresponding to a second consumer, wherein the second consumer is seating at a table where the first consumer is seating.

18. The computer-readable medium of claim 15, wherein the computer-executable instructions further cause the AR computing device to cause to be displayed, via the AR display device, the AR data at a position relative to the scanned location, wherein the position is at least one of above and near the scanned location.

19. The computer-readable medium of claim 15, wherein the computer-executable instructions further cause the AR computing device to select the AR data displayed on the AR display device using one or more predefined settings associated with the AR display device.

20. The computer-readable medium of claim 15, wherein the computer-executable instructions further cause the AR computing device to:

start a timer tracking a time required for an order to be ready, the order associated with the order data; and cause to be displayed, via the AR display device, the timer at a position relative to the scanned location, wherein the position is at least one of above and near the prep station.

\* \* \* \* \*